(12) United States Patent
Purdy et al.

US012018210B2

(10) Patent No.: US 12,018,210 B2
(45) Date of Patent: *Jun. 25, 2024

(54) METHODS FOR STIMULATING A HYDROCARBON-BEARING FORMATION BY PERFORATING A WELLBORE AND INTRODUCING AN ACIDIC COMPOSITION IN THE WELLBORE

(71) Applicant: Fluid Energy Group Ltd., Calgary (CA)

(72) Inventors: Clay Purdy, Medicine Hat (CA); Markus Weissenberger, Calgary (CA)

(73) Assignee: DORF KETAL CHEMICALS FZE, Fujairah (AE)

( * ) Notice: Subject to any disclaimer, the term of this patent is extended or adjusted under 35 U.S.C. 154(b) by 0 days.

This patent is subject to a terminal disclaimer.

(21) Appl. No.: 18/069,091

(22) Filed: Dec. 20, 2022

(65) Prior Publication Data

US 2023/0120003 A1 Apr. 20, 2023

Related U.S. Application Data

(63) Continuation of application No. 17/054,439, filed as application No. PCT/CA2019/000067 on May 10, 2019, now Pat. No. 11,591,511.

(30) Foreign Application Priority Data

May 11, 2018 (CA) .................. CA 3004675

(51) Int. Cl.
*E21B 43/28* (2006.01)
*C09K 8/03* (2006.01)
*C09K 8/06* (2006.01)
*C09K 8/42* (2006.01)
*C09K 8/46* (2006.01)
*C09K 8/54* (2006.01)
*C09K 8/60* (2006.01)
*C09K 8/74* (2006.01)
*C23F 11/04* (2006.01)
*E21B 21/00* (2006.01)
*E21B 41/02* (2006.01)
*E21B 43/119* (2006.01)
*E21B 43/26* (2006.01)
*E21B 43/27* (2006.01)
*E21B 33/12* (2006.01)
*E21B 43/116* (2006.01)

(52) U.S. Cl.
CPC .............. *C09K 8/74* (2013.01); *C09K 8/032* (2013.01); *C09K 8/06* (2013.01); *C09K 8/426* (2013.01); *C09K 8/46* (2013.01); *C09K 8/54* (2013.01); *C09K 8/602* (2013.01); *C23F 11/04* (2013.01); *E21B 21/00* (2013.01); *E21B 41/02* (2013.01); *E21B 43/119* (2013.01); *E21B 43/26* (2013.01); *E21B 43/27* (2020.05); *E21B 43/283* (2013.01); *C09K 2208/32* (2013.01); *E21B 33/12* (2013.01); *E21B 43/116* (2013.01)

(58) Field of Classification Search
CPC . C09K 8/74; C09K 8/032; C09K 8/06; C09K 8/426; C09K 8/54; C09K 2208/12; E21B 43/27; E21B 43/119; E21B 41/02; E21B 43/116
See application file for complete search history.

(56) References Cited

U.S. PATENT DOCUMENTS

| | | |
|---|---|---|
| 2,799,659 A | 7/1957 | Mayhew et al. |
| 2,863,780 A | 12/1958 | Ball et al. |
| 2,913,408 A | 11/1959 | Pumpelly et al. |
| 3,146,208 A | 8/1964 | Fisher et al. |
| 3,231,507 A | 1/1966 | Beale et al. |
| 3,260,673 A | 7/1966 | Fisher et al. |
| 3,288,555 A | 11/1966 | Napler et al. |
| 3,404,094 A | 10/1968 | Keeney et al. |
| 3,457,185 A | 7/1969 | Betty et al. |
| 3,466,192 A | 9/1969 | Gardner et al. |

(Continued)

FOREIGN PATENT DOCUMENTS

| | | |
|---|---|---|
| AU | 86977/91 B | 11/1993 |
| EP | 0009247 A1 | 4/1986 |

(Continued)

OTHER PUBLICATIONS

Written Opinion dated Aug. 14, 2019 in International Application No. PCT/CA2019/000067, 6 pages.

(Continued)

*Primary Examiner* — Silvana C Runyan
(74) *Attorney, Agent, or Firm* — Berg Hill Greenleaf Ruscitti LLP

(57) ABSTRACT

The invention includes methods for stimulating a hydrocarbon-bearing formation by perforating a wellbore and introducing an acidic composition in the wellbore. A preferred embodiment includes inserting an isolation plug in the wellbore at a predetermined location followed by inserting a perforating tool and a breakdown acid into the wellbore. The wellbore is perforated by the tool to create a perforated area. The breakdown acid is allowed to come into contact with the perforated area for a predetermined period of time sufficient to prepare the formation for stimulation. The tool is then removed from the wellbore wherein stimulation of the perforated area is thereby initiated. Also disclosed is a corrosion inhibiting composition for use with the acidic composition.

3 Claims, 4 Drawing Sheets

(56) References Cited

U.S. PATENT DOCUMENTS

| | | | |
|---|---|---|---|
| 3,535,240 | A | 10/1970 | Lyness et al. |
| 3,668,137 | A | 6/1972 | Gardner |
| 3,770,377 | A | 11/1973 | Scott et al. |
| 3,819,527 | A | 6/1974 | Hayman, Jr. |
| 4,018,703 | A | 4/1977 | Turner |
| 4,039,336 | A | 8/1977 | Sullivan, 3rd et al. |
| 4,089,789 | A | 5/1978 | Muzyczko et al. |
| 4,171,279 | A | 10/1979 | Martin |
| 5,120,471 | A | 6/1992 | Jasinski et al. |
| 5,411,670 | A | 5/1995 | Walker |
| 5,531,934 | A | 7/1996 | Freeman et al. |
| 5,591,381 | A | 1/1997 | Walker |
| 5,890,536 | A * | 4/1999 | Nierode ............... E21B 43/261 166/308.1 |
| 5,961,885 | A | 10/1999 | Eaton et al. |
| 8,618,027 | B2 | 12/2013 | Meyer et al. |
| 9,868,894 | B1 | 1/2018 | Jafar Mazumder et al. |
| 10,059,872 | B2 | 8/2018 | Janak et al. |
| 10,221,347 | B2 | 3/2019 | Smith et al. |
| 2003/0183808 | A1 | 10/2003 | Walker |
| 2007/0018135 | A1 | 1/2007 | McCormick et al. |
| 2007/0069182 | A1 | 3/2007 | Cassidy et al. |
| 2007/0071887 | A1 | 3/2007 | Cassidy et al. |
| 2007/0284109 | A1 | 12/2007 | East et al. |
| 2008/0139414 | A1 | 6/2008 | Cassidy et al. |
| 2008/0227668 | A1 | 9/2008 | Welton |
| 2008/0227669 | A1 | 9/2008 | Welton |
| 2009/0221455 | A1 | 9/2009 | Ke et al. |
| 2009/0247431 | A1 | 10/2009 | Gupta et al. |
| 2010/0105580 | A1 | 4/2010 | Becker |
| 2011/0028360 | A1 | 2/2011 | Jenkins |
| 2011/0269223 | A1 | 11/2011 | Van Der Meuler et al. |
| 2013/0192837 | A1 * | 8/2013 | Curtis ..................... C09K 8/72 166/308.1 |
| 2014/0091262 | A1 | 4/2014 | Webber et al. |
| 2014/0135239 | A1 | 5/2014 | Fellows et al. |
| 2015/0047838 | A1 | 2/2015 | Lecerf et al. |
| 2015/0118105 | A1 | 4/2015 | Liu et al. |
| 2015/0337638 | A1 * | 11/2015 | Lawrence ............... C09K 8/80 166/300 |
| 2016/0222279 | A1 | 8/2016 | Cassidy |
| 2018/0127882 | A1 * | 5/2018 | Reyes ..................... C23F 11/04 |
| 2018/0135187 | A1 | 5/2018 | Crawford et al. |
| 2018/0135381 | A1 * | 5/2018 | Tolman ................. E21B 43/117 |
| 2018/0312980 | A1 | 11/2018 | Crawford et al. |

FOREIGN PATENT DOCUMENTS

| | | |
|---|---|---|
| EP | 0593230 A1 | 4/1994 |
| EP | 1929072 A1 | 6/2008 |
| EP | 2179001 A1 | 4/2010 |
| GB | 1461136 A | 1/1977 |
| JP | 2006348324 A | 12/2006 |
| NL | 1015012 C2 | 11/2000 |
| RU | 2648372 C1 | 3/2018 |
| WO | 2002103081 A2 | 12/2002 |
| WO | 2008110789 A1 | 9/2008 |
| WO | 2016089394 A1 | 6/2016 |

OTHER PUBLICATIONS

International Preliminary Report on Patentability dated Nov. 17, 2020 in International Application No. PCT/CA2019/000067, 7 pages.

International Search dated Aug. 14, 2019 in International Application No. PCT/CA2019/000067, 2 pages.

* cited by examiner

METHODS FOR STIMULATING A HYDROCARBON-BEARING FORMATION BY PERFORATING A WELLBORE AND INTRODUCING AN ACIDIC COMPOSITION IN THE WELLBORE

CROSS REFERENCE TO RELATED APPLICATION

This application is a continuation of U.S. application Ser. No. 17/054,439, filed Nov. 10, 2020, which is a national stage application under 35 U.S.C. 371 of PCT Application No. PCT/CA2019/000067 having an international filing date of May 10, 2019, which designated the United States, which PCT application claimed the benefit of Canadian Application Serial No. 3,004,675, filed May 11, 2018. The entire specifications and figures of the above-referenced applications are hereby incorporated in their entireties by reference.

FIELD OF THE INVENTION

This invention relates to method for performing downhole processes in the oil and gas industry, more specifically to various corrosion inhibitor compositions and processes to enhance well productivity for substantially reducing stimulation time and water use during hydraulic fracturing operations.

BACKGROUND OF THE INVENTION

In the oil & gas industry, stimulation with an acid is performed on a well to increase or restore production. In some instances, a well initially exhibits low permeability, and stimulation is employed to commence production from the reservoir. In other instances, stimulation or remediation is used to further encourage permeability and flow from an already existing well that has become under-productive due to scaling issues or formation depletion.

Acidizing is a type of stimulation treatment which is performed above or below the reservoir fracture pressure in an effort to initiate, restore or increase the natural permeability of the reservoir. Acidizing is achieved by pumping acid, predominantly hydrochloric acid, into the well to dissolve typically limestone, dolomite and calcite cement between the acid insoluble sediment grains of the reservoir rocks or to treat scale accumulation.

There are three major types of acid applications: matrix acidizing, fracture acidizing, and breakdown acidizing (pumped prior to a fracturing pad or cement operation in order to assist with formation breakdown (reduce fracture pressures, increased feed rates), as well as clean up left over cement in the well bore or perforations.

A matrix acid treatment is performed when acid is pumped into the well and into the pores of the reservoir formation below the fracture pressure. In this form of acidization, the acids dissolve the sediments formation and/or mud solids that are inhibiting the permeability of the rock, enlarging the natural pores of the reservoir (wormholing) and stimulating the flow of hydrocarbons to the wellbore for recovery.

While matrix acidizing is done at a low enough pressure to keep from fracturing the reservoir rock, fracture acidizing involves pumping acid into the well at a very high pressure, physically fracturing the reservoir rock and etching the permeability inhibitive sediments. This type of acid treatment forms channels or fractures through which the hydrocarbons can flow, in addition to forming a series of wormholes. In some instances, a proppant is introduced into the fluid which assists in propping open the fractures, further enhancing the flow of hydrocarbons into the wellbore. There are many different mineral and organic acids used to perform an acid treatment on wells. The most common type of acid employed on wells to stimulate production is hydrochloric acid (HCl), which is useful in stimulating carbonate reservoirs.

It has been estimated that fracking can improve the production of a well by at least 10-20%. Also, as is well known to the person of ordinary skill in the art, a well can be fracked multiple times during its production life. The process of hydraulic fracturing or fracking requires the following steps. Once the determination of the wellbore's integrity has been assessed, the location of the perforations is determined. Subsequently, after a cement liner is in place, one must clear out the debris, and pump a plug and perforating guns to a desired depth and location. The plug is set slightly beyond the desired location to be stimulated and then the cemented liner in that zone is perforated by using perforating guns, creating a path for fracking fluid to be forced into the shale formation.

The final stage prior to fracking requires the use of perforating guns, typically a string of shaped charges lowered to a predetermined location within the wellbore. Once in position, the perforating gun is discharged and perforates the casing.

According to the conventional process, after perforation stage is completed, the tools are removed from the well. A ball is pumped down to isolate the zones below the plug. This process applies to solid bridge plugs (no ball) with which process it is required to squeeze wellbore fluid into the perforations at low or reduced rates until acid reaches the perforations and increases permeability to initiate a fracture and reduce injection pressures and also applies to "ball in cage" or other processes where the isolation ball can be placed just prior to, during or immediately after the perforating is completed.

A large volume of fracturing fluid is then pumped into the desired formation in a well. The high-pressure at which the fracturing fluid is pumped coupled with the constant pumping provide an increase in the fluidic pressure within the formation which leads to fracturing inside the reservoir.

After the fracturing pressure is reached fracturing fluid containing propping agents (proppant) are injected into the formation to increase the fractures within the formation and insert proppant to maintain the fractures open. The last step of the fracturing operation before being put back into production is to flush the well form all the loose proppants and fracturing fluids.

A slickline is a single strand wire used in the oil and gas industry transport tools within a well. It is typically a single wire strand set up on a spool located on what is referred to as a slickline truck. A slickline is connected by the drum it is spooled off the back of the slickline truck. A slickline is used to lower tools within a wellbore in order to perform a specific operation. Although not common for perforating work, slickline still has the potential to be involved in various workover activities. Wireline (or electric line) is the traditional way to run perforating guns or systems. Wireline provides the advantages of real-time depth control, high tensile strength, long term cycling life spans and selective firing control of the perorating system.

In highly deviated wells, flow restricted wells or specific other mechanical or stimulation methods may require coiled tubing to be utilized to transport or place the perforation guns into position, i.e. at a predetermined location. Modern slickline, coiled tubing or wireline may also allow incorporated integrated information transmission technology which can communicate real time information to the operator including but not limited to; depth, temperature and pressure. This type of information provides operators sufficient information to perform a plug and perforation operation by accurately targeting desirable hydrocarbon-bearing formations.

The benefit of this strategy is greater control of the placement of perorations and thus the stimulation. In many cases, casing the entire wellbore allows the operator better control of the stimulation, production and other life-cycle aspects of the reservoir fluids. It also allows the operator to select the formation which will be stimulated in order to obtain increased well production. It also allows the operator to seal off perforated sections, which have had their hydrocarbons extracted or are producing minimal oil or gas etc.

Accordingly, in light of the state of the art of fracking technology, there still exists a need to successfully develop a method or improve the current process which reduces the waste of water, minimizes equipment time on each stage of the method, provides a more optimal, reduced injection rate for the stage, provide a method and chemical to ensure optimal diversion of acid across all perforations as currently acid will tend to go the path of least resistance due to down-hole fluid dynamics. Most acid will only reach the top portion of perforations causing an increased or non-optimal injection rate and associated pressures during the stimulation. The resolution of this problem lies in combining a chemical composition with the mechanical tools in a specific order to achieve a more efficient oil recovery method.

There are a wide variety of corrosion inhibitor packages disclosed in the prior art, the following are but a sampling of what is known: US 2018312980-A1; U.S. Pat. No. 9,868,894-B1; US 2018127882-A1; US 2018135187-A1; RU-2648372-C1; U.S. Ser. No. 10/059,872-B2; US 2015118105-A1; US 2016222279-A1; US 2014091262-A1; U.S. Pat. No. 8,618,027-B2; US 2014135239-A1; US 2010105580-A1; US 2011269223-A1; US 2011028360-A1; US 2009247431-A1; US 2009221455-A1; EP-2179001-A1; US 2008227668-A1; US 2008227669-A1; WO 2008110789-A1; US 2008139414-A1; US 2007071887-A1; US 2007069182-A1; EP-1929072-A1; JP-2006348324-A; US 2007018135-A1; US 2003183808-A1; WO 02103081-A2; NL 1015012-C2; U.S. Pat. No. 5,961,885-A; U.S. Pat. No. 5,531,934-A; U.S. Pat. No. 5,591,381-A; EP-0593230-A1; U.S. Pat. No. 5,411,670-A; U.S. Pat. No. 5,120,471-A; EP-0009247-A1; U.S. Pat. No. 4,171,279-A; U.S. Pat. No. 4,039,336-A; U.S. Pat. No. 4,018,703-A; U.S. Pat. No. 3,819,527-A; U.S. Pat. No. 4,089,789-A; U.S. Pat. No. 3,770,377-A; U.S. Pat. No. 3,668,137-A; U.S. Pat. No. 3,535,240-A; U.S. Pat. No. 3,466,192-A; U.S. Pat. No. 3,457,185-A; U.S. Pat. No. 3,404,094-A; U.S. Pat. No. 3,288,555-A; U.S. Pat. No. 3,260,673-A; U.S. Pat. No. 3,146,208-A; U.S. Pat. No. 3,231,507-A; U.S. Pat. No. 2,863,780-A; U.S. Pat. No. 2,913,408-A; and U.S. Pat. No. 2,799,659-A. All of these patents are hereby incorporated by reference.

For example, teachings from acid corrosion inhibitors as made and described in the above documents may be utilized in practicing the method according to a preferred embodiment of the present invention.

Stainless steel has a high chrome content compared to other steels such as carbon steels. This makes stainless steel more prone to corrosion from acids. In that respect, in order to perform a method where the perforating tool, wireline or slickline and casing remain exposed to the acid downhole during the breakdown or spearhead placement step for potentially an extended period (hereinafter referred to as a one-step plug and perf and spearhead stage), it is desirable to have a suitable acid composition. Such an acid composition would necessarily be suitable for exposure to stainless steel and other carbon metals (from which most wirelines, slicklines and bottom hole tools connected to such are constructed of). When discussing suitability of exposure, the person skilled in the art will understand that the acid composition is sufficiently inhibited from damaging the steel of the wireline/slickline/casing as well as the tools mounted thereon to afford an economically advantageous method of performing one-step plug and perf and spearhead over the conventional method which requires a two-step approach to performing the plug and perf and then performing the spearhead stage after the tools are removed from the hole, adding time and consuming larger amounts of water The art teaches many corrosion inhibitor compositions but not all such compositions can be said to be appropriate for use with stainless steel and standard oilfield casing, such as P110, for long term exposure cycles. Stainless steel like all other steels or alloys has advantages and drawbacks depending on the type of operations being carried out, stainless steel alloys may not be easily or readily substituted out by any other steel alloys as they are industry standard. Therefore, as one looks to develop and implement new and better processes to use in the oil and gas industry one must consider suitable corrosion inhibitor packages to minimize, or substantially eliminate corrosion on stainless steel alloys, wirelines/slicklines, down hole tools and common casing metallurgies. Such corrosion packages must be useful in preventing corrosion on stainless steel alloys as this is the metal of choice for wirelines/slicklines and the bottom hole assemblies used in several downhole oil and gas industry operations.

Accordingly, in light of the state of the art of stimulation and other downhole oil and gas industry operations, there still exists a need to develop a method which reduces the waste of water and decreases the time required to fully stimulate a well with multiple stages utilizing the common plug & perforate method. The resolution of this problem lies, in part, through the combination of an acidic chemical composition with the mechanical components in order to achieve a more efficient stimulation method.

SUMMARY OF THE INVENTION

The inventors have developed new downhole methods applicable in the oil and gas industry to provide at least one advantage over the conventional processes. The inventors have concurrently determined that certain corrosion inhibitor compositions could be applied to the acid composition used in the downhole treatment (for example, spearhead/breakdown) of cementitious debris in order to minimize the corrosion to the tools, casing and wireline or slickline used in said processes. This cementitious debris consists of the wellbore casing cement which has been perforated during a plug and perf operation. This is one of the steps prior to the fracturing of a hydrocarbon-bearing formation.

According to an aspect of the present invention, there is provided an integrated method for the perforating a of casing and cleaning up debris inside and or near the wellbore, said method comprising the steps of:
  providing a wellbore having a casing;
  concurrently inserting a zonal isolation plug, a perforating tool and a spearhead or breakdown acid composition simultaneously or in conjunction into the wellbore;

setting the plug in the wellbore at a predetermined location;

positioning the perforating tool at a predetermined location;

perforating the wellbore with the tool thereby creating a perforated area on the casing allowing access to the formation;

allowing the spearhead acid to come into contact with the wireline, perforating tools and perforated area for a predetermined period of time sufficient to prepare the formation for stimulation; and removing the tool form the wellbore;

wherein the acid composition comprises a corrosion inhibition adapted for long or short term use with stainless steel alloys and common casing metallurgy.

Preferably, the acids used are selected from the group consisting of: mineral acids; organic acids; modified acids; synthetic acids; and combinations thereof. More preferably, the acids used are selected from the group consisting of: HCl; methanesulfonic acid; sulfamic acid; toluenesulfonic acid; HCl-alkanolamine; HCl-amino acid, such as lysine; etc.

According to a preferred embodiment, the acid composition comprises a corrosion inhibitor package comprising at least two compounds selected from: Group A; Group B; Group C; Group D; Group E; Group F; Group G; Group H; and Group I, where the at least two compounds are selected from different groups and where:

Group A comprises compounds encompassed within the following general chemical description: α,β-unsaturated aldehyde; Formaldehyde; Cinnamaldehyde;

Group B comprises compounds encompassed within the following general chemical description: acetylenic compound; unsaturated alcohol; acetylinic alcohol; alkoxylated acetylenic alcohol; alkoxy phenols; diacetylenic alcohols;

Group C comprises compounds encompassed within the following general chemical description:
  group 15 metal (bismuth, antimony);
  antimony compounds;
  germanium compounds;

Group D comprises compounds encompassed within the following general chemical description:
  sulfur-containing compounds;
  mercapto-compounds;
  organosulfur compounds
  reaction products of thiourea;
  thiodiglycol alkoxylates;

Group E comprises compounds encompassed within the following general chemical description: nitrogen-containing surfactant; and
  nonionic surfactant.

Group F comprises compounds encompassed within the following general chemical description:
  morpholine;
  aminoalkyl imidazolines;
  sarcosine;
  two linked cyclic molecules with at least one nitrogen heterocycle (e.g. quinoline+benzyl);
  imidazoline; and
  alkyl pyridine.

Group G comprises compounds encompassed within the following general chemical description:
  aromatic ketone;
  amide; and
  phenyl ketone.

Group H comprises compounds encompassed within the following general chemical description:
  heavy aromatic solvent.

Group I comprises compounds encompassed within the following general chemical description:
  carboxylic acid-containing compounds;
  hydroxyacid compounds; and
  nitro-aromatic compounds with at least 1 carboxylic acid group, said compounds preferably selected from the group consisting of dinitrosalicylic acid, nitrophthalic acid, mononitroterephthalic acid and dinitroterephthalic acid.

According to a preferred embodiment, the Group A compound is selected from the group consisting of:
  α,β-unsaturated aldehyde selected from the group consisting of:
  cinnamaldehyde, t-cinnamaldehyde, crotonaldehyde, acrolein, methacrolein, leafaldehyde, citral, furfural, (E)-2-methyl-2-butenal, β-methyl-2-butenal, (E)-2-ethyl-2-butenal, (E)-2-ethyl-2-hexenal, 2-hexenal, 2-heptenal, 2-octenal, 2-nonenal, 2-decenal, 2-undecenal, 2-dodecenal, 2,4-hexadienal, 2,4-heptadienal, 2,4-octadienal, 2,4-nonadienal, 2,4-decadienal, 2,4-undecadienal, 2,4-dodecadienal, 2,6-dodecadienal, 1-formyl42-(2-methylvinyl)1-2-n-octylethylene, dicinnamaldehyde, p-hydroxycinnamaldehyde, p-methylcinnamaldehyde, p-ethylcinnamaldehyde, p-methoxycinnamaldehyde, p-dime thylaminocinnamaldehyde, p-diethylaminocinnamaldehyde, p-nitrocinnamaldehyde, o-nitrocinnamaldehyde, o-allyloxycinnamaldehyde, 4-(3-propenal)cinnamaldehyde, p-sodium sulfocinnamaldehyde, p-trimethylammoniumcinnamaldehyde sulfate, p-trimethylammoniumcinnamaldehyde o-methylsulfate, p-thiocyanocinnamaldehyde, p-(S-acetyl)thiocinnamaldehyde, p-(S—N,N-dimethylcarbamoylthio)cinnamaldehyde, p-chlorocinnamaldehyde, 5-phenyl-2,4-pentadienal, 5-(p-methoxyphenyl)-2,4-pentadienal, 2,3-diphenylacrole in, 3,3-diphenylacrolein, α-methylcinnamaldehyde, β-methylcinnamaldehyde, α-chlorocinnamaldehyde, α-bromocinnamaldehyde, α-butylcinnamaldehyde, α-amylcinnamaldehyde, α-hexylcinnamaldehyde, 2-(p-methylbenzylidine)decanal, α-bromo-p-cyanocinnamaldehyde, α-ethyl-p-methylcinnamaldehyde, p-methyl-α-pentylcinnamaldehyde, 3,4-dimethoxy-α-methylcinnamaldehyde, α-R4-methylphenyl)methylenelbenzeneacetaldehyde, α-(hydroxymethylene)-4-methylbenzylacetaldehyde, 4-chloro-α-(hydroxymethylene)benzeneacetaldehyde, α-nonylidenebenzeneacetaldehyde, derivatives thereof, and combinations thereof.

According to a preferred embodiment, the Group B compound is selected from the group consisting of: propargyl alcohol, propoxylated propargyl alcohol, 2-hydroxyethyl propargyl ether, or a mixture thereof; acetylenic compounds such as, for example, acetylenic compounds having the general formula: $R_1CCCR_2R_3OH$ where $R_1$, $R_2$, and $R_3$ are, independently from one another, hydrogen, alkyl, phenyl, substituted phenyl, or hydroxy-alkyl radicals,
  where $R_1$ is preferably hydrogen
  $R_2$ is preferably hydrogen, methyl, ethyl, or propyl radicals;
  $R_3$ is preferably an alkyl radical having the general formula C111-1211,
  n is an integer from 1 to 10.

According to another preferred embodiment of the present invention, the acetylenic compound $R_1 CCCR_2R_3 OR_4$ 4 has an $R_4$ which is a hydroxy-alkyl radical. Examples of acetylenic alcohols suitable for use in the composition of the present invention include, but are not limited to, methyl butynol, methyl pentynol, hexynol, ethyl octynol, propargyl alcohol, benzylbutynol, ethynylcyclohexanol, ethoxy acetylenics, propoxy acetylenics, and mixtures thereof. Preferred alcohols are hexynol, propargyl alcohol, methyl butynol, ethyl octynol, propargyl alcohol ethoxylate; propargyl alcohol propoxylate; and mixtures thereof. When used, the acetylenic compounds may be present in an amount from ranging from about 0.01% to about 10% by weight of acid composition. In certain preferred embodiments, an acetylenic compound may be present in an amount from about 0.1% to about 1.5% by weight of acid composition.

of:

According to a preferred embodiment, the Group C compound is selected from the group consisting
  a metal compound selected from the group consisting of antimony compounds selected from the group consisting of antimony oxides, antimony halides, antimony tartrate, antimony citrate, alkali metal salts of antimony tartrate and antimony citrate, alkali metal salts of pyroantimonate, antimony adducts of ethylene glycol and mixtures thereof,
  a metal compound selected from the group consisting of bismuth compounds selected from the group consisting: of bismuth oxides, bismuth halides, bismuth tartrate, bismuth citrate, alkali metal salts of bismuth tartrate and bismuth citrate, bismuth oxyhalogens, and mixtures thereof; and
  mixtures of said antimony compounds and said bismuth compounds.

According to a preferred embodiment, the Group D compound is selected from the group consisting of: thioglycolic acid; alkali metal thiosulfates; alkali metal thiosulfate hydrates; derivatives thereof; and combinations thereof. According to a preferred embodiment, the sulfur-containing compound may be present in an amount in the range of from about 1% to about 20% by weight of the corrosion inhibitor package. According to another preferred embodiment, the sulfur-containing compound may be present in a corrosion-inhibiting additive of the present invention in an amount of about 9% by weight of the additive. In certain embodiments, the sulfur-containing compound may be present in a treatment fluid of the present invention in an amount in the range of from about 0.005% to about 0.4% by weight of the treatment fluid. A person of ordinary skill in the art will understand which amount of a sulfur-containing compound to include in a corrosion-inhibiting package or treatment fluid of the present invention depending on, among other things, the amount and/or type of acid(s) present in a particular application of the present invention, the composition of the remainder of the corrosion-inhibiting additive and/or treatment fluid used, the composition of the corrodible surface where the additive or treatment fluid of the present invention is used, temperature, the longevity of corrosion-inhibition desired, the degree of corrosion-inhibition desired, and the like.

According to a preferred embodiment, the Group E nitrogen-containing surfactant is selected from the group consisting of: alkyl amide surfactants, amine oxide surfactants, derivatives thereof, and combinations thereof.

According to a preferred embodiment, the Group F compound is selected from the group consisting of: amines having from 1 to 24 carbon atoms in each alkyl moiety as well as the six-membered heterocyclic amines, for example, alkyl pyridines, crude quinolines and mixtures thereof. Preferably, the amines are selected from the group consisting of: ethylamine; diethylamine; trimethylamine; propylamine; dipropylamine; tripropylamine; mono-, di- and tripentylamine; mono-, di- and trihexylamine; and isomers of these such as isopropylamine; tertiarybutylamine. According to another preferred embodiment, the amine is selected from the group consisting of: alkyl pyridines having from one to five nuclear alkyl substituents per pyridine moiety, such alkyl substituents having from one to 12 carbon atoms, and preferably those having an average of six carbon atoms per pyridine moiety, such as a mixture of high boiling tertiary-nitrogen-heterocyclic.

According to a preferred embodiment, the Group G compound is selected from the one of the following three groups consisting of:
  acetophenone, mesityl oxide, 1-acetonaphthone, p-methoxyacetophenone, propiophenone, p-chloroacetophenone, isophorone, tetrolophenone, 2,4-pentanedione, a mixture of phenethyl alcohol and acetophenone, 2-acetylcyclohexanone, 2-acetonaphthone, 2-thienylketone, methyl isobutylketone, n-butyrophenone, acetone, 3,4-dihydro-1-(2H)-naphthalenone, 2-heptanone, diacetone alcohol, undecanone-2, and mixtures thereof;
  formaldehyde, benzaldehyde, heptanal, propanal, hexanal, octanal, decanal, hexadecanal, cinnamaldehyde, aldehyde generating materials selected from the group consisting of paraformaldehyde, urotropin new, paraldehyde, acetals, hemiacetals and sulfite addition products, and mixtures thereof; and
  rendered animal fat, octanoic acid, myristic acid, pelargonic acid, abietic acid, lauric acid, oleic acid, caprylic acid, tall oil acid, ethoxylated coco, fatty acid, ethoxylated oleic acid, ethoxylated rosin fatty acid, tall oil reacted with propylene oxide and ethylene oxide, 2-methyl pyridine, 4-methyl pyridine, 2-methyl quinoline, 4-methyl quinoline, and mixtures thereof.

According to a preferred embodiment, the Group H compound is selected from the group consisting of: heavy aromatic solvents having a boiling point of 200-300 degrees Celsius.

According to a preferred embodiment, Group I compounds are selected from the group consisting of: carboxylic acid containing compounds and nitro-aromatic compounds with at least 1 carboxylic acid group. Preferably, the nitro-aromatic compound with at least 1 carboxylic acid group is selected from the group consisting of: dinitrosalicylic acid; nitrophthalic acid; mononitroterephthalic acid; and dinitroterephthalic acid effective to inhibit corrosion of the steel. The organic hydroxyacidis selected from a group consisting of: hydroxy acid containing 2 to 10 carbon atoms with at least one hydroxyl group and at least one carboxylic acid group, and alkaline metal salts of these organic hydroxyacids, and amine salts of these organic hydroxyacids, and combinations thereof. Preferably the hydroxyacid is selected from the group consisting of:2-hydroxyacetic acid (glycolic acid), 2-hydroxypropanoic acid (lactic acid), 3-hydroxypropanoic acid (hydracrylic acid), 2-hydroxybutyric acid (alpha-hydroxybutyric acid), 2-hydroxybutyric acid (beta-hydroxybutyric acid, 4-hydroxybutyric acid (gamma-hydroxybutyric acid), 2-hydroxybenzoic acid (salicylic acid), 3-hydroxybenzoic acid, 4-hydroxybenzoic acid, 3,4,5-trihydroxybenzoic acid (gallic acid), and alkaline metal salts of these organic hydroxyacids, and amine salts of these organic hydroxyacids and combinations thereof. Preferably, the hydroxyl acid is selected from the group consisting of an ethanolamine salt of glycolic acid, a butyl amine salt of glycolic acid, a dibutylamine salt of glycolic acid, and combinations thereof.

According to a preferred embodiment of the present invention, the corrosion inhibition package can be selected from the following combinations:
- a compound of group B and a compound of group F;
- a compound of group B and a compound of group D;
- a compound of group B, a compound of group C and a compound of group F;
- a compound of group A, a compound of group D and a compound of group E;
- a compound of group A, a compound of group B and a compound of group C;
- a compound of group B and a compound of group E;
- a compound of group A, a compound of group D and a compound of group G;
- a compound of group A and a compound of group D;
- a compound of group F, a compound of group G and a compound of group H;
- a compound of group A and a compound of group G;
- a compound of group B and a compound of group F; and
- a compound of group A and a compound of group C;
- where each group is represented by at least one compound.

According to a preferred embodiment of the present invention, the corrosion inhibition package can be selected from the following combinations of group where reactions occur between compounds of said groups:
- a compound of Group F reacted with a compound of Group A; and
- a compound of Group F reacted with a compound of Group G.

According to a preferred embodiment of the present invention, the corrosion inhibition package can be selected from the following combinations of group where reactions occur between compounds of said groups:
- a compound of group C with a reaction product of a compound of group B and of group F.

According to another aspect of the present invention, there is provided a method for the stimulation of a hydrocarbon-bearing formation during a plug & perforate completion method, said method comprising the steps of:
- providing a wellbore in need of stimulation;
- concurrently inserting a plug in the wellbore at a predetermined location;
- inserting a perforating tool and a spearhead or breakdown acid into the wellbore simultaneously;
- positioning the tool at a predetermined location;
- perforating the wellbore with the tool thereby creating a perforated area and access to the formation;
- allowing the spearhead acid to come into contact with the perforated area for a predetermined period of time sufficient to prepare the formation for stimulation or perforating directly in the acid so as to optimize diversion of the acid across the perforation cluster;
- removing the tool form the wellbore; and
- initiating the stimulation of the perforated area using a stimulation fluid.

Preferably, the spearhead acid comprises a corrosion inhibitor adapted to prevent damaging corrosion to the tool, wireline, slickline, casing or any other exposed alloys, metals or elastomers during the period of exposure with said components. Preferably, the perforating tool is a perforating gun.

Preferably also, the spearhead acid is selected from the group consisting of: mineral acids; organic acids; modified acids; synthetic acids; and combinations thereof. More preferably, the spearhead acid further comprises a corrosion inhibitor. Even more preferably, the spearhead acid is selected from the group consisting of: methanesulphonic acid; HCl:amino acid; HCl:alkanolamine. Preferably, the amino acid is selected from the group consisting of: lysine; lysine monohydrochloride; alanine; asparagine; aspartic acid; cysteine; glutamic acid; histidine; leucine; methionine; proline; serine; threonine; valine; and combinations thereof. Preferably also, the alkanolamine is selected from the group consisting of: monoethanolamine; diethanolamine; triethanolamine and combinations thereof.

According to a preferred embodiment of the present invention, there is provided a corrosion inhibiting composition for use with an acid, said composition comprising: citral and/or cinnamaldehyde.

Preferably, the corrosion inhibiting composition comprises:
- an alkyne alcohol;
- a terpene, preferably selected from the group consisting of: citral; carvone; ionone; ocimene; cymene; and combinations thereof, most preferably the terpene is citral;
- cinnamaldehyde or a derivative thereof; and
- a solvent.

More preferably, the corrosion inhibiting composition comprises at least one surfactant.

Preferably, the alkyne alcohol is propargyl alcohol.

Preferably, the solvent is selected from the group consisting of: methanol; ethanol; a 6,3-ethoxylate; and isopropanol. More preferably, the solvent is isopropanol.

Preferably, the alkyne is present in an amount ranging from 10-40% v/v of the composition. Preferably also, citral is present in an amount ranging from 5-15% v/v of the composition. Preferably also, the cinnamaldehyde or a derivative thereof is present in an amount ranging from 7.5-20% v/v of the composition. Preferably also, the solvent is present in an amount ranging from 10-40% v/v of the composition. According to a preferred embodiment of the present invention, the surfactant is present in an amount ranging from 10-40% v/v of the composition. Preferably, the surfactant comprises a betaine or a sultaine. According to a preferred embodiment, the surfactant comprises a betaine and B-Alanine, N-(2-carboxyethyl)-N-dodecyl-, sodium salt (1:1).

Preferably, the corrosion inhibiting composition further comprises a metal iodide or iodate selected from the group consisting of: cuprous iodide; potassium iodide and sodium iodide.

According to a first aspect of the present invention there is provided a method for spotting acid in a wellbore, said method comprising the steps of:
- providing a wellbore in need of stimulation;
- inserting an isolation plug in the wellbore at a predetermined location;
- inserting a perforating tool and a spearhead or breakdown acid into the wellbore simultaneously;
- positioning the tool at a predetermined location;
- perforating the wellbore with the tool thereby creating a perforated area and access to the formation;
- allowing the spearhead acid to come into contact with the perforated area for a predetermined period of time sufficient to prepare the formation for stimulation or perforating directly in the acid so as to optimize diversion of the acid across the perforation cluster;
- According to a preferred embodiment of the present invention, the acidic compositions used in said methods comprise a corrosion inhibitor composition effective at a temperature of up to 110° C., and in some preferred compositions effective at temperature of up to 130° C.

In the most preferable cases, the corrosion inhibitor composition is stable at temperatures of up to 180° C.

According to a preferred embodiment of the present invention, the corrosion inhibitor composition provides effective protection to both carbon steel alloys as well as stainless steel and stainless-steel alloys for the duration period the components are exposed to the acidic composition.

BRIEF DESCRIPTION OF THE FIGURES

Features and advantages of embodiments of the present application will become apparent from the following detailed description and the appended figures, in which.

DESCRIPTION OF THE INVENTION

Figure 1:
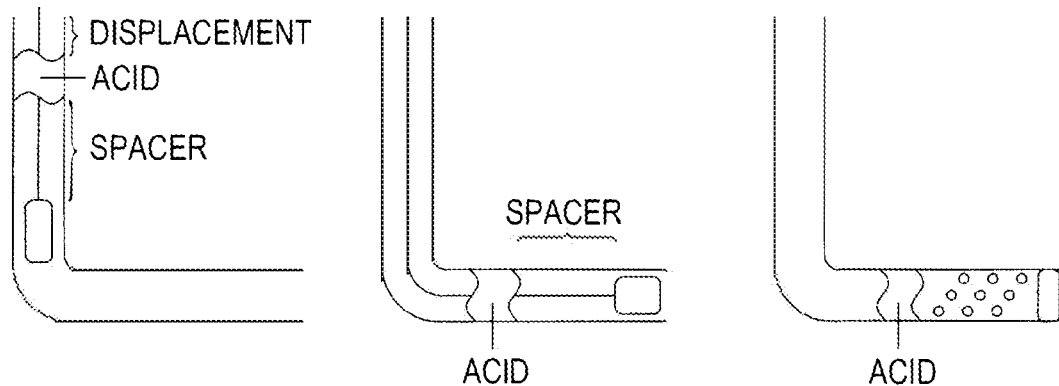
FIG. 1 is a schematic diagram illustrating the general steps according to a preferred method of the present invention.
Figure 2:
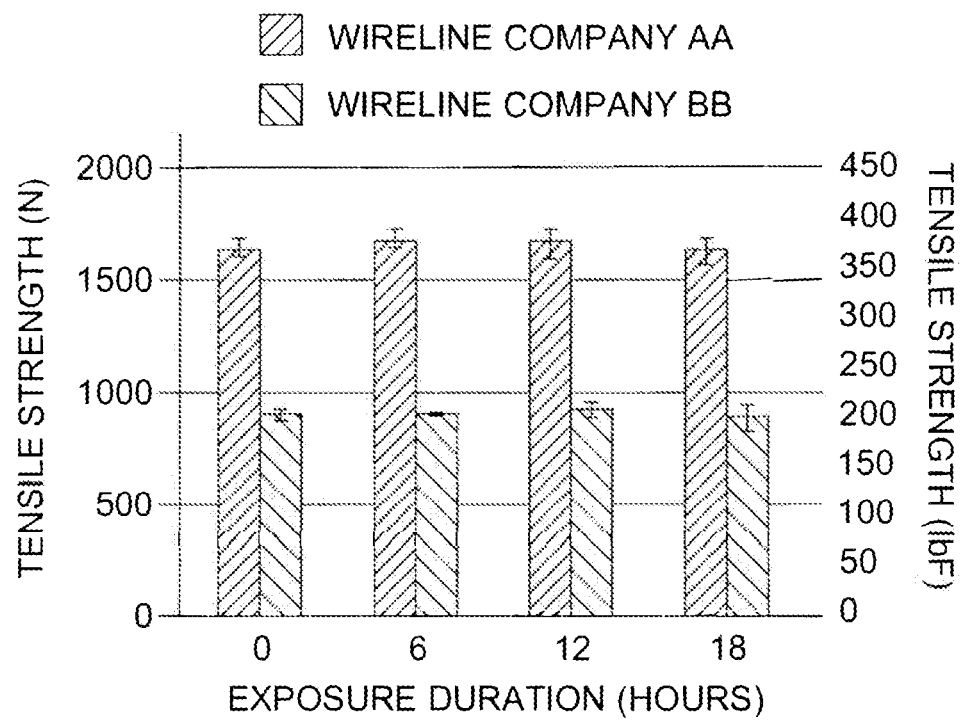
FIG. 2 is a comparative chart tensile strength of wire line samples after exposure to 33% MEA:HCl (in a molar ratio of 1:6.4) at 110° C. (230° F.)

The description that follows, and the embodiments described therein, is provided by way of illustration of an example, or examples, of particular embodiments of the principles of the present invention. These examples are provided for the purposes of explanation, and not limitation, of those principles and of the invention.

In a conventional plug and perforate operations, the isolation plug is set in the well, the casing is perforated by a tool (guns), then the tool is pulled out of the hole and then acid is pumped and circulated to the perforations (this process can take hours in some extreme cases) and once a feed rate is reached they begin the stimulation for that stage of the well. The process is then repeated (over 40 to 100 or more stages in many cases).

According to a preferred embodiment of the present invention, the method allows for an operator to pump the tools down with the spearhead acid to perforate the zone and let the acid sit over the perforations or perforate in the acid. This is followed by the removal of the tool from the wellbore and initiating of the stimulation immediately following the perforating tools removal, thereby greatly increasing the efficiency of the operation by removing an entire step from the common process.

According to a preferred embodiment of the present invention, this method can save up to an one (1) hour per stage at an average cost of $20,000/hr (for the stimulation crew and equipment) and 30-50 m$^3$ (8000-13,250 gallons) of water per stage depending on depth, casing size and final method. In an average 50-stage well, this can translate into savings of up to or over $1,000,000 in time plus the saved water of up to or over 800,000 gallons. The potential savings from the implementation of this method in operations in the North America alone could reach upwards of several hundreds of millions of dollars per year for the industry and billions of gallons of water saved.

HCl is the most commonly used acid in stimulation or for spearhead acid. With this in mind, one must understand that perforation tools and the deployment wireline systems are mostly comprised of stainless steel to ensure longevity and offer the highest level or performance. Conventional plug and perforation processes require the removal of the perforation guns immediately after the perforation stage otherwise the spearhead acid could compromise the perforating guns and deployment wireline systems because of their propensity to attack stainless-steel and stainless-steel alloys. A critical factor in allowing a process to have stainless steel predominate components exposed to strong acids such as HCl is the ability to control or minimize corrosion to a level below which would normally render a stainless-steel tool and wireline deployment system unusable after only a few cycles (or even less in some cases).

With the development of a novel corrosion inhibitor which affords substantial long-term acidic exposure protection of stainless steel or such acid sensitive alloys from damage from exposure to hydrochloric acid (HCl), there is a never-seen-before industrial or industry-wide scale possibility of removing a time and water consuming step of the pre-stimulation process, thereby saving substantial time, money and water resources. The advantages are compounded when using optimal acidic compositions (i.e. effectiveness and corrosion inhibition) as more wells and more perforation operations can be carried out. The savings are compounded by the number of operations which are carried out without replacing the bottom hole assembly and/or the wireline/slickline or coiled tubing or applicable conveyance method.

According to a preferred embodiment of the present invention, one can use a ball-in-cage or similar technology to isolate the wellbore below the area to be perforated as the acidic composition (comprising the corrosion inhibitor) provides sufficient corrosion protection to maintain the integrity of the isolation system, casing, wireline and perforating tools for a desired period of time.

Preferably, the surfactant is selected from the group consisting of: a sultaine surfactant; a betaine surfactant; and combinations thereof. More preferably, the sultaine surfactant and betaine surfactant are selected from the group consisting of: an amido betaine surfactant; an amido sultaine surfactant; and combinations thereof. Yet even more preferably, the amido betaine surfactant and is selected from the group consisting of: an amido betaine comprising a hydrophobic tail from C8 to C16. Most preferably, the amido betaine comprising a hydrophobic tail from C8 to C16 is cocamidobetaine.

Preferably also, the corrosion inhibition package further comprises an anionic surfactant. Preferably, the anionic surfactant is a carboxylic surfactant. More preferably, the carboxylic surfactant is a dicarboxylic surfactant. Even more preferably, the dicarboxylic surfactant comprises a hydrophobic tail ranging from C8 to C16. Most preferably, the dicarboxylic surfactant is sodium lauriminodipropionate Most preferred are embodiments of a corrosion inhibition package comprising cocamidopropyl betaine and B-Alanine, N-(2-carboxyethyl)-N-dodecyl-, sodium salt (1:1).

According to a preferred embodiment of the present invention, when preparing an acidic composition comprising a corrosion inhibition package, metal iodides or iodates such as potassium iodide, sodium iodide, cuprous iodide and lithium iodide can be added as corrosion inhibitor intensifier. The iodide or iodate is preferably present in a weight/ volume percentage ranging from 0.05 to 1.5%, more preferably from 0.25 to 1.25%, yet even more preferably 1% by weight/volume of the acidic composition. Most preferably, the iodide used is potassium iodide.

According to a preferred embodiment of the present invention, the corrosion package comprises: 2-Propyn-1-ol, compd. with methyloxirane; B-Alanine, N-(2-carboxyethyl)-N-dodecyl-, sodium salt (1:1); cocamidopropyl betaine; (±)-3,7-Dimethyl-2,6-octadienal (Citral); cinnamaldehyde; and isopropanol.

More preferably, the composition comprises 20% of 2-Propyn-1-ol, compd. with methyloxirane; 20% of B-Alanine, N-(2-carboxyethyl)-N-dodecyl-, sodium salt (1:1); 20% of cocamidopropyl betaine; 7.5% of (±)-3,7-Dimethyl-2,6-octadienal (Citral); 12.5% cinnamaldehyde; and 20% of Isopropanol (all percentages are volume percentages). A point of note, the surfactant molecules comprise only roughly ⅓ of the actual content of the entire surfactant blend as the balance, roughly ⅔, is comprised of water so as to control the viscosity of the surfactant when admixed with the other components. This is typical of surfactant blends in this and other industries.

According to a preferred embodiment of the present the corrosion inhibitor composition comprises cinnamaldehyde or a derivative thereof selected from the group consisting of: cinnamaldehyde; dicinnamaldehyde p-hydroxycinnamaldehyde; p-methylcinnamaldehyde; p-ethylcinnamaldehyde; p-methoxycinnamaldehyde; p-dime thylaminocinnamaldehyde; p-diethylaminocinnamaldehyde; p-nitrocinnamaldehyde; o-nitrocinnamaldehyde; 4-(3-propenal)cinnamaldehyde; p-sodium sulfocinnamaldehyde p-trimethylammoniumcinnamaldehyde sulfate; p-trime thylammoniumcinnamaldehyde o-methylsulfate; p-thiocyanocinnamaldehyde; p-(S-acetyl)thiocinnamaldehyde; p-(S-N,N-dimethylcarbamoylthio)cinnamaldehyde; p-chlorocinnamaldehyde; α-methylcinnamaldehyde; β-methylcinnamaldehyde; α-chlorocinnamaldehyde α-bromocinnamaldehyde; α-butylcinnamaldehyde; α-amylcinnamaldehyde; α-hexylcinnamaldehyde; α-bromo-p-cyanocinnamaldehyde; α-ethyl-p-methylcinnamaldehyde and p-methyl-α-pentylcinnamaldehyde.

According to a preferred embodiment, the acid is an aqueous modified acid composition comprising: a mineral acid and an alkanolamine in a molar ratio of not more than 15:1.

According to another preferred embodiment, the acid is an aqueous modified acid composition comprising: hydrochloric acid and an alkanolamine in a molar ratio of not more than 15:1.

According to a preferred embodiment, the acid is an aqueous modified acid composition according to claim 2, wherein the hydrochloric acid and alkanolamine are present in a molar ratio of not more than 10:1.

According to a preferred embodiment, the acid is an aqueous modified acid composition according to claim 2, wherein the hydrochloric acid and alkanolamine are present in a molar ratio of not more than 7.0:1. More preferably, hydrochloric acid and alkanolamine are present in a molar ratio of not more than 4:1. Even more preferably, hydrochloric acid and alkanolamine are present in a molar ratio of not more than 3:1.

According to a preferred embodiment, the alkanolamine is selected from the group consisting of: monoethanolamine; diethanolamine; triethanolamine and combinations thereof. Preferably, the alkanolamine is monoethanolamine.

According to a preferred embodiment of the present invention, the method uses a synthetic acid composition comprising: a strong acid and an alkanolamine in a molar ratio of not more than 15:1; preferably in a molar ratio not more than 10:1, more preferably in a molar ratio of not more than 8:1; even more preferably in a molar ratio of not more than 5:1; yet even more preferably in a molar ratio of not more than 3.5:1; and yet even more preferably in a molar ratio of not more than 2.5:1.

Preferably, the main components in terms of volume and weight percent of the composition set out above comprise an alkanolamine and a strong acid, such as HCl, nitric acid, sulfuric acid, sulfonic acid.

An alkanolamine, as per the above, contains at least one amino group, —NH$_2$, and one alcohol group, —OH. Preferred alkanolamines include, but are not limited to, monoethanolamine, diethanolamine and triethanolamine. More preferred are monoethanolamine, diethanolamine. Most preferred is monoethanolamine. When added to hydrochloric acid a Lewis acid/base adduct is formed where the primary amino group acts as a Lewis base and the proton of the HCl as Lewis acid. The formed adduct greatly reduces the hazardous effects of the hydrochloric acid on its own, such as the fuming effect, the hygroscopicity, and the highly corrosive nature.

The molar ratio of the two main components can be adjusted or determined depending on the intended application and the desired solubilizing ability. According to a preferred embodiment where the strong acid is HCl, one can increase the ratio of the HCl component to increase the solubilizing ability of the composition while still providing at least one of the following advantages: health; safety; environmental; and operational advantages over hydrochloric acid.

Various corrosion inhibitors can be incorporated into an acid composition used in a preferred embodiment of the method according to the present invention, such composition comprises a strong acid and an alkanolamine to reduce corrosion on the steel which is contacted.

Preferably, the composition may further comprise organic compounds which may act as corrosion inhibitors selected from the group consisting of: acetylenic alcohols, aromatic or aliphatic aldehydes (e.g. α,β-unsaturated aldehydes), alkylphenones, amines, amides, nitrogen-containing heterocycles (e.g. imidazoline-based), iminium salts, triazoles, pyridine and its derivatives or salts, quinoline derivatives, thiourea derivatives, thiosemicarbazides, thiocyanates, quaternary amine salts, and condensation products of carbonyls and amines. Intensifiers which can be incorporated into compositions according to the present invention are selected from the group consisting of: formic acid, potassium iodide, antimony oxide, copper iodide, sodium iodide, lithium iodide, aluminum chloride, bismuth oxide, calcium chloride, magnesium chloride and combinations of these. Preferably, an iodide compound such as potassium iodide is used. Other additives can be optionally added to a composition according to a preferred embodiment of the present invention. A non-limiting list of such common additives includes iron control agents (e.g. reducing agents), water-wetting surfactants, non-emulsifiers, de-emulsifiers, foaming agents, anti-sludging agents, clay and/or fines stabilizer, scale inhibitors, mutual solvents, friction reducer. Alcohols and derivatives thereof, such as alkyne alcohols and derivatives and preferably propargyl alcohol and derivatives thereof can be used as corrosion inhibitors. Propargyl alcohol itself is traditionally used as a corrosion inhibitor which works well at low concentrations. It is however a very toxic/flammable chemical to handle as a concentrate, so care must be taken when exposed to the concentrate. In some cases, it is preferred to use 2-Propyn-1-ol, complexed with methyloxirane, as this is a much safer derivative to handle. Basocorr® PP is an example of such a compound. Metal iodides or iodates such as potassium iodide, sodium iodide, cuprous iodide and lithium iodide can potentially be used as corrosion inhibitor intensifier along with the composition according to preferred embodiments of the present invention. In fact, potassium iodide is a metal iodide traditionally used as corrosion inhibitor intensifier, however it is expensive, but works extremely well. It is non-regulated and safe to handle. The iodide or iodate is preferably present in a weight percentage ranging from 0.05 to 5 wt %, more preferably from 0.2 to 3 wt %, yet even more preferably from 0.25 to 2 wt %.

According to a preferred embodiment of the present invention, the composition comprising an alkanolamine and a strong acid may further comprise a corrosion inhibition package itself comprising a terpene; a cinnamaldehyde or a derivative thereof; at least one amphoteric surfactant; and a solvent.

In other preferred embodiments of the present invention, 2-Propyn-1-ol, complexed with methyloxirane can be present in a range of 0.05-5.0 wt/wt %, preferably it is present in an amount ranging from 0.1 to 3 wt %, even more preferably from 0.5 to 2.0 wt/wt % and yet even more preferably from 0.75 to 1.5 wt/wt %. As a substitute for potassium iodide one could use sodium iodide, copper iodide and lithium iodide. However, potassium iodide is the most preferred.

According to a preferred embodiment of the present invention, there is provided an integrated method of matrix acidizing a hydrocarbon-containing limestone formation, said method comprising:
  providing a well in need of stimulation;
  providing a composition comprising a HCl and lysine mixture and water; wherein the molar ratio between the HCl and the lysine ranges from 4.5:1 to 8.5:1;
  injecting said composition downhole into said formation at a pressure below the fracking pressure of the formation; and
  allowing a sufficient period of time for the composition to contact said formation to create wormholes in said formation.

Lysine & hydrogen chloride are present in a molar ratio ranging from 1:3 to 1:12.5; preferably in a molar ratio ranging from 1:4.5 to 1:9, and more preferably in a molar ratio ranging from more than 1:5 to 1:8.5.

According to a preferred embodiment of the present invention, the acid used is neat HCl.

The corrosion inhibitor composition further comprises a metal iodide or iodate selected from the group consisting of: cuprous iodide; potassium iodide and sodium iodide. Preferably, the metal iodide or iodate is potassium iodide. According to another preferred embodiment of the present invention, the metal iodide or iodate is sodium iodide. According to yet another preferred embodiment of the present invention, the metal iodide or iodate is cuprous iodide.

Table 1 includes a prior composition (CI-5) and a composition according to a preferred embodiment of the present invention (CI-5 SS).

TABLE 1

Composition of various tested corrosion inhibitor packages

|  |  | CI-5 | CI-5SS |
|---|---|---|---|
| 2-Propyn-1-ol, compd. with methyloxirane | Vol % | 45 | 20 |
| .beta.-Alanine, N-(2-carboxyethyl)-N-dodecyl-, sodium salt (1:1) | Vol % | 11.7 | 20 |
| Cocamidopropyl betaine | Vol % | 11.7 | 20 |
| (±)-3,7-Dimethyl-2,6-octadienal (Citral) | Vol % | 7 | 7.5 |
| Cinnamaldehyde | Vol % | 0 | 12.5 |
| Isopropanol | Vol % | 24.6 | 20 |
| Total Vol % |  | 100 | 100 |

Corrosion Testing

Corrosion inhibitor compositions according to preferred embodiments of the present invention were exposed to corrosion testing. The results of the corrosion tests and comparative corrosion testing are reported in Tables 2 through 5. Various steel grades (stainless steel and carbon steel) were subjected to acid compositions comprising corrosion inhibitors according to the present invention against known corrosion inhibitors to the listed compositions for various periods of time at varying temperatures. A desirable corrosion inhibition result was one where the lb/ft2 corrosion number is at or below 0.05. More preferably, that number is at or below 0.02.

33% HCl:MEA in a 5.5:1 ratio and 50% HCl:MEA in a 5.5:1 ratio indicate the volume amount of the original concentration of a stock solution containing HCl and Monoethanolamine in a ratio of 5.5:1. The HCl loading of a 33% HCl:MEA in a 5.5:1 ratio is approximately 6.5% HCl. The HCl loading of 50% HCl:MEA in a 5.5:1 ratio is approximately 10% HCl.

TABLE 2

Corrosion testing of 316 steel coupons with various acidic fluid at various temperature run of 12 hours at a temperature of 90° C.

| Steel type | Fluid | Corrosion inhibitor | Loss wt (g) | Surface area (cm2) | Density (g/cc) | Mils/yr | Mm/year | Lb/ft2 |
|---|---|---|---|---|---|---|---|---|
| 316 | 33% HCl:MEA in a ratio of 5.5:1 | 1.0% CI-5 0.75% CI-1A 0.1% NE-1 | 1.2899 | 20.968 | 7.92 | 2232.38 | 56.702 | 0.126 |
| 316 | 50% HCl:MEA in a ratio of 5.5:1 | 1.0% CI-5 0.75% CI-1A 0.1% NE-1 | 1.3647 | 20.968 | 7.92 | 2361.83 | 59.991 | 0.133 |

*33% and 50% indicate the level of the original concentration of a stock solution containing HCl and Monoethanolamine in a ratio of 5.5:1.
**All percentages are given in volume/volume % of the total volume of the fluid.

TABLE 3

Corrosion testing of various steel coupons with various acidic fluid at various temperature run time of 6 hours

| Steel type | fluid | Temp (° C.) | Corrosion inhibitor | Loss wt (g) | Surface area (cm2) | Density (g/cc) | Mils/yr | Mm/year | Lb/ft2 |
|---|---|---|---|---|---|---|---|---|---|
| 316 | 33% HCl:MEA in a ratio of 5.5:1 | 90 | 1.0% CI-5 incl 0.1% ZA 0.75% CI-1A 0.1% NE-1 | 0.2706 | 20.968 | 7.92 | 936.63 | 23.79 | 0.026 |
| 316 | 33% HCl:MEA in a ratio of 5.5:1 | 90 | 2.0% CI-5 0.75% CI-1A 0.1% NE-1 | 0.5990 | 20.968 | 7.92 | 2073.33 | 52.66 | 0.058 |
| 316 | 33% HCl:Urea in a ratio of 1:0.7 | 90 | 0.75% CI-2 0.5% CI-4A 0.5% CI-1A 0.1% NE-1 | 0.8117 | 20.968 | 7.92 | 2809.56 | 71.36 | 0.079 |
| 316 | 33% HCl:MEA in a ratio of 5.5:1 | 90 | 2.0% CI-5 0.75% CI-1A 0.1% NE-1 | 1.1770 | 20.968 | 7.92 | 4073.98 | 103.48 | 0.115 |
| 316 | 33% HCl:MEA in a ratio of 5.5:1 | 90 | 0.75% CI-2 0.5% CI-4A 0.5% CI-1A 0.1% NE-1 | 1.1348 | 20.968 | 7.92 | 3927.91 | 99.77 | 0.110 |
| 316 | 33% HCl:MEA in a ratio of 5.5:1 | 90 | 1.50% CI-5SS 1.0% CI-1A 0.1% NE-1 | 0.1422 | 20.968 | 7.92 | 492.20 | 12.50 | 0.014 |
| 316 | 33% HCl:MEA in a ratio of 5.5:1 | 90 | 1.50% CI-5SS 1.0% CI-1A 0.1% NE-1 | 0.3277 | 20.968 | 7.92 | 756.18 | 19.21 | 0.032 |
| 316 | 50% HCl:MEA in a ratio of 5.5:1 | 90 | 1.50% CI-5SS 1.0% CI-1A 0.1% NE-1 | 0.1974 | 20.968 | 7.92 | 683.27 | 17.36 | 0.019 |
| 316 | 33% HCl:MEA in a ratio of 5.5:1 | 90 | 1.50% CI-5SS 1.0% CI-1A 0.1% NE-1 | 0.6878 | 20.968 | 7.92 | 1587.13 | 40.31 | 0.067 |
| 316 | 50% HCl:MEA in a ratio of 5.5:1 | 90 | 1.50% CI-5SS 1.0% CI-1A 0.1% NE-1 | 0.2246 | 20.968 | 7.92 | 777.41 | 19.75 | 0.022 |
| L80 | 33% HCl:MEA in a ratio of 5.5:1 | 90 | 1.50% CI-5SS 1.0% CI-1A 0.1% NE-1 | 0.147 | 28.922 | 7.86 | 370.68 | 9.42 | 0.010 |
| P110 | 33% HCl:MEA in a ratio of 5.5:1 | 90 | 1.50% CI-5SS 1.0% CI-1A 0.1% NE-1 | 0.112 | 34.839 | 7.86 | 236.15 | 5.998 | 0.007 |
| 316 | 33% HCl:MEA in a ratio of 5.5:1 | 90 | 1.50% CI-5SS 1.0% CI-1A 0.1% NE-1 | 0.0593 | 20.968 | 7.92 | 205.26 | 5.214 | 0.006 |
| 316 | 33% HCl:MEA in a ratio of 5.5:1 | 110 | 1.50% CI-5SS 1.0% CI-1A 0.1% NE-1 | 0.2499 | 20.968 | 7.92 | 864.98 | 21.971 | 0.024 |
| L80 | 33% HCl:MEA in a ratio of 5.5:1 | 110 | 1.50% CI-5SS 1.0% CI-1A 0.1% NE-1 | 0.134 | 28.922 | 7.86 | 338.06 | 8.587 | 0.009 |
| P110 | 33% HCl:MEA in a ratio of 5.5:1 | 110 | 1.50% CI-5SS 1.0% CI-1A 0.1% NE-1 | 0.150 | 34.839 | 7.86 | 315.49 | 8.014 | 0.009 |
| QT900 | 33% HCl:MEA in a ratio of 5.5:1 | 110 | 1.50% CI-5SS 1.0% CI-1A 0.1% NE-1 | 0.082 | 34.839 | 7.86 | 171.50 | 4.356 | 0.005 |
| 316 | 50% HCl:MEA in a ratio of 5.5:1 | 110 | 1.50% CI-5SS 1.0% CI-1A 0.1% NE-1 | 0.1675 | 20.968 | 7.92 | 579.77 | 14.726 | 0.016 |

TABLE 3-continued

Corrosion testing of various steel coupons with various acidic fluid at various temperature run time of 6 hours

| Steel type | fluid | Temp (° C.) | Corrosion inhibitor | Loss wt (g) | Surface area (cm2) | Density (g/cc) | Mils/yr | Mm/year | Lb/ft2 |
| --- | --- | --- | --- | --- | --- | --- | --- | --- | --- |
| L80 | 50% HCl:MEA in a ratio of 5.5:1 | 110 | 1.50% CI-5SS 1.0% CI-1A 0.1% NE-1 | 0.123 | 28.922 | 7.86 | 312.02 | 7.925 | 0.009 |
| P110 | 50% HCl:MEA in a ratio of 5.5:1 | 110 | 1.50% CI-5SS 1.0% CI-1A 0.1% NE-1 | 0.132 | 34.839 | 7.86 | 277.71 | 7.054 | 0.008 |
| QT900 | 50% HCl:MEA in a ratio of 5.5:1 | 110 | 1.50% CI-5SS 1.0% CI-1A 0.1% NE-1 | 0.084 | 34.839 | 7.86 | 176.11 | 4.473 | 0.005 |
| 316 | 7.5% HCl | 90 | 1.50% CI-5SS 1.0% CI-1A 0.1% NE-1 | 0.0729 | 20.968 | 7.92 | 252.33 | 6.409 | 0.007 |
| 316 | 10% HCl | 90 | 1.50% CI-5SS 1.0% CI-1A 0.1% NE-1 | 0.0406 | 20.968 | 7.92 | 140.53 | 3.569 | 0.004 |
| 316 | 15% HCl | 90 | 1.50% CI-5SS 1.0% CI-1A 0.1% NE-1 | 0.0254 | 20.968 | 7.92 | 87.92 | 2.233 | 0.002 |
| 316 | 10% HCl | 90 | 1.50% CI-5 1.0% CA 0.1% NE-1 | 0.0309 | 20.968 | 7.92 | 106.95 | 2.717 | 0.003 |

Notes:
CI-2 is a commercially available corrosion inhibitor (ASP 560)
NE-1 is a non-emulsifier.
CI-4A is propargyl alcohol with methyloxirane.
CI-1A is a 10 wt % potassium iodide solution in water
ZA refers to cinnamaldehyde

TABLE 4

Corrosion testing carried out at 110° C. for a duration of 6 hours on various types of steel

| Steel type | Fluid | Corrosion inhibitor | Loss wt. (g) | Surface area (cm2) | Density (g/cc) | Mils/yr | Mm/year | Lb/ft2 |
| --- | --- | --- | --- | --- | --- | --- | --- | --- |
| 316 | 50% HCl:MEA in a ratio of 5.5:1 | 1.50% CI-5SS 1.0% CI-1A 0.1% NE-1 | 0.1675 | 20.968 | 7.92 | 579.77 | 14.726 | 0.016 |
| L80 | 50% HCl:MEA in a ratio of 5.5:1 | 1.50% CI-5SS 1.0% CI-1A 0.1% NE-1 | 0.123 | 28.922 | 7.86 | 312.02 | 7.925 | 0.009 |
| P110 | 50% HCl:MEA in a ratio of 5.5:1 | 1.50% CI-5SS 1.0% CI-1A 0.1% NE-1 | 0.132 | 34.839 | 7.86 | 277.71 | 7.054 | 0.008 |
| QT900 | 50% HCl:MEA in a ratio of 5.5:1 | 1.50% CI-5SS 1.0% CI-1A 0.1% NE-1 | 0.084 | 34.839 | 7.86 | 176.11 | 4.473 | 0.005 |

TABLE 5

Corrosion testing at 90° C. for a duration of 6 hours for stainless steel 316 coupons having a density of 7.92 g · cc and surface area of 20.968 cm2

| Fluid | Corrosion inhibitor | Wt loss (g) | Mils/yr | Mm/year | Lb/ft2 |
|---|---|---|---|---|---|
| 7.5% HCl | 0.50% CI-5SS 0.33% CI-1A 0.033% NE-1 | 0.0970 | 335.75 | 8.528 | 0.009 |
| 10% HCl | 0.50% CI-5SS 0.33% CI-1A 0.033% NE-1 | 0.0838 | 290.09 | 7.368 | 0.008 |
| 15% HCl | 0.50% CI-5SS 0.33% CI-1A 0.033% NE-1 | 0.0967 | 334.71 | 8.502 | 0.009 |
| 10% HCl | 0.50% CI-5SS 0.33% CI-1A 0.033% NE-1 | 0.1729 | 598.46 | 15.201 | 0.017 |
| 33% HCl:Urea in a ratio of 1:0.7 | 1.50% CI-5SS 1.0% CI-1A 0.1% NE-1 | 0.7512 | 2600.15 | 66.044 | 0.073 |
| 10% HCl | No CI | 2.4590 | 8511.40 | 216.189 | 0.239 |

The corrosion testing results obtained indicate, that a preferred corrosion inhibitor composition, the presence of an alkyne alcohol (propargyl alcohol) and cinnamaldehyde. Separately they did not provide corrosion protection sufficient to allow the novel method disclosed herein to be implemented. The difficulty with the use of cinnamaldehyde is to maintain it dispersed at higher temperatures such as 90° C. to 110° C. A preferred surfactant package used in the present invention is capable of providing such cinnamaldehyde dispersion but requires higher loadings than usual. Citral has shown some effectiveness for the prevention of pitting at higher temperatures (even 110° C. to 120° C.). The cinnamaldehyde is an effective film former at these temperatures and was able to provide protection to the stainless steel.

The inventors have noted that, surprisingly, modified acids containing urea are not desirable as they have a stability upper limit of approximately 80° C. Above this temperature, the urea component starts to breakdown or decompose yielding ammonia and $CO_2$ neutralizing the acidic component and therefore, it would not be the ideal candidate for wireline perforations operations as most operations are performed at temperatures close to or above 80° C. Corrosion inhibitor compositions according to preferred embodiment of the present invention have shown excellent versatility at high temperature (up to 130° C.) between conventional acids (HCl) and modified acids (HCl:MEA) as well as steel types (QT900 (stainless steel); P110 (carbon steel); L80 (carbon steel); 316 (stainless steel)).

As illustrated in FIG. 1, pumping acid downhole while the wireline and perforating tool is present downhole has been shown in the field to save, in some instances 15 to 60 minutes per perforation operation. Moreover, the savings of water are equally staggering. The following is but a list of substantial advantages of performing such a method: combining pumping down the plug with the ball (or similar isolation method) and acid; reducing perforating and acid spotting cycle time; and greatly reducing water volumes required thus greatly cutting costs and increasing operational efficiency.

Example 1—Wireline Testing Experiments

Specific tests for a modified acid composition comprising an alkanolamine:HCl blend (present in a molar ratio of 1:6.4 also containing a corrosion inhibitor package)(diluted to one third of its stock solution, i.e. 33%) and a commercialised 7.5% HCl acid blend (containing a CI package) spearhead blend were performed on wire line samples to simulate long term field exposure conditions under extreme conditions. Due to cool down effect and limited real world exposure times, these tests would be indicative of a long-term duty cycle.

The tensile strength and corrosion tests were executed on wire line samples provided by Company B. One sample was exposed to 33% alkanolamine:HCl composition and another sample was exposed to the 7.5% HCl acid blend for 96 and 120 consecutive hours at 90° C. (194° F.) at 600 psi. The weight loss of the wire line samples is expected to be attributed not only the corrosion of the steel but also the degradation of the binding material. After the corrosion test cycle, tensile strength testing was conducted on two strands pulled from the wire line exposed to the 33% alkanolamine:HCl composition. The tensile strength values for each strand were equal to control samples that were not exposed to the acid. Tensile strength testing was not performed on the wire line exposed to the 7.5% HCl acid blend due to excessive corrosion.

Example 2—P110 Coupon Corrosion Tests

Long term corrosion tests on P110 coupons with a 33% alkanolamine:HCl composition and the 7.5% HCl acid blend at 90° C. (194° F.) were also carried out. The corrosion properties of the 33% % alkanolamine:HCl composition was observed to provide superior protection in comparison to the 7.5% HCl acid blend over a long time period. The testing allows to select an ideal composition which will minimize corrosion to the wireline over a number of plug and perf operations. However, it should be noted that a less than optimal acidic composition (comprising a corrosion inhibitor) may be employed in order to substantially reduce time spent on pre-frac operations, minimize water volumes used and therefore, provide a financial advantage of performing this method as well as a substantial water usage reduction over the conventional approach used prior to this novel method.

Procedure: To determine the corrosion properties of unspent 33% alkanolamine:HCl composition and the 7.5% HCl acid blend (containing a CI package), the acid blends were evaluated at 90° C. (194° F.) on P110 coupons for 96 hours (4 days) at ambient pressure. The corrosion tests were executed in samples jars in a water bath. The corrosion rates were determined from the weight loss after the coupons were washed and dried.

Results: The testing results confirms the feasibility of a widespread implementation of the method according to a preferred embodiment of the present invention where the step of removing a perforating tool prior to injection of the spearhead acid composition is removed and the tool and wireline are exposed downhole during the perforation and acid placement step of the method.

Example 3—Field Trial

A major E&P company operating in Western Canada performing horizontal multi-stage slickwater completions on multi well pads. Using plug and perf completion technique they were targeting the Duvernay and Montney formations. Reservoir temperatures were approximately 230° F. Historically 15% HCl acid was used to breakdown the formation, clean cement material left over from the perforation process, reduce injection pressures and assist in fracture propagation and initiation.

Figure 3A:
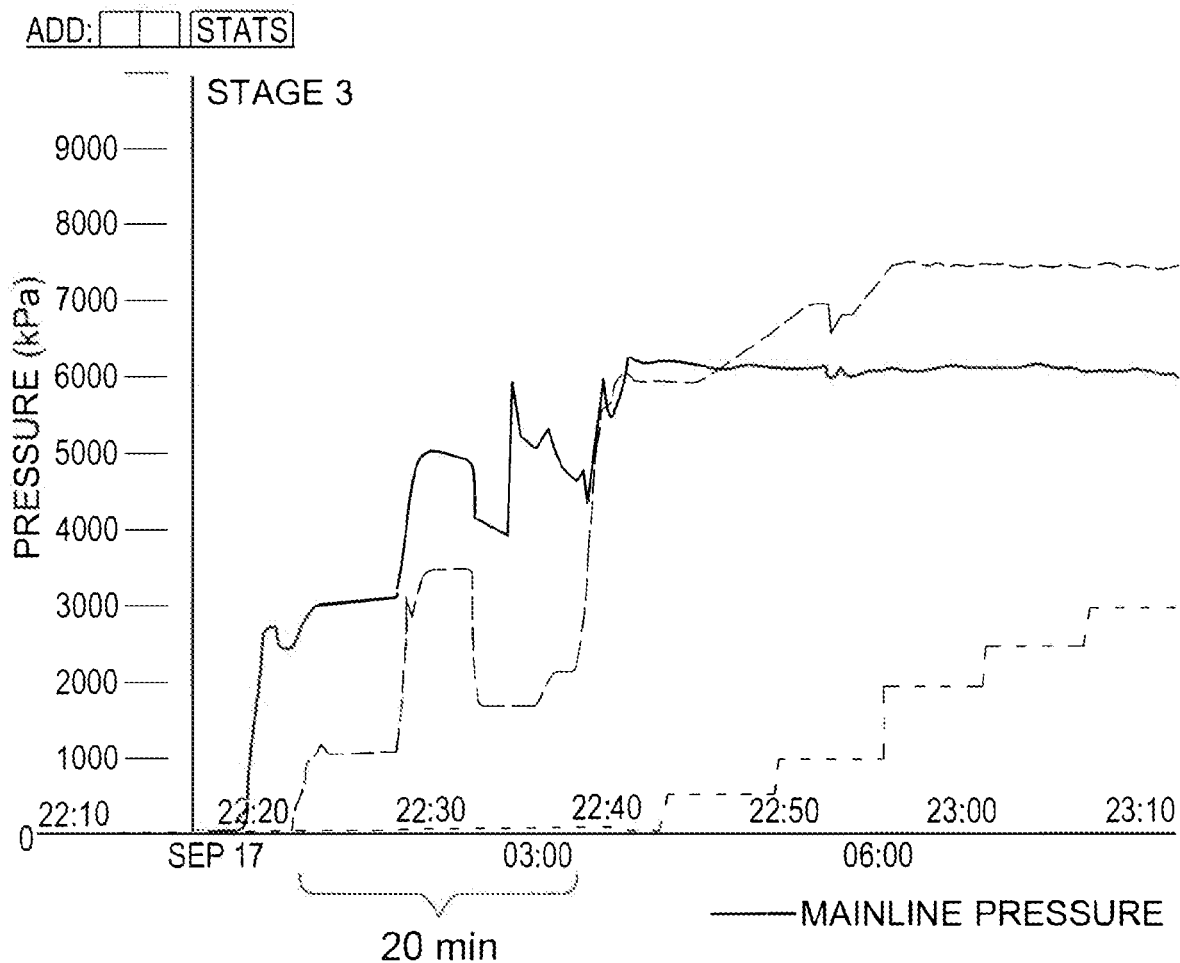
FIG. 3 illustrates a side-by-side comparison of the injection procedure in pre-fracking and fracking operations, the left graph showing the conventional process and the right graph showing a preferred embodiment of the method according to the present invention.
Figure 3B:
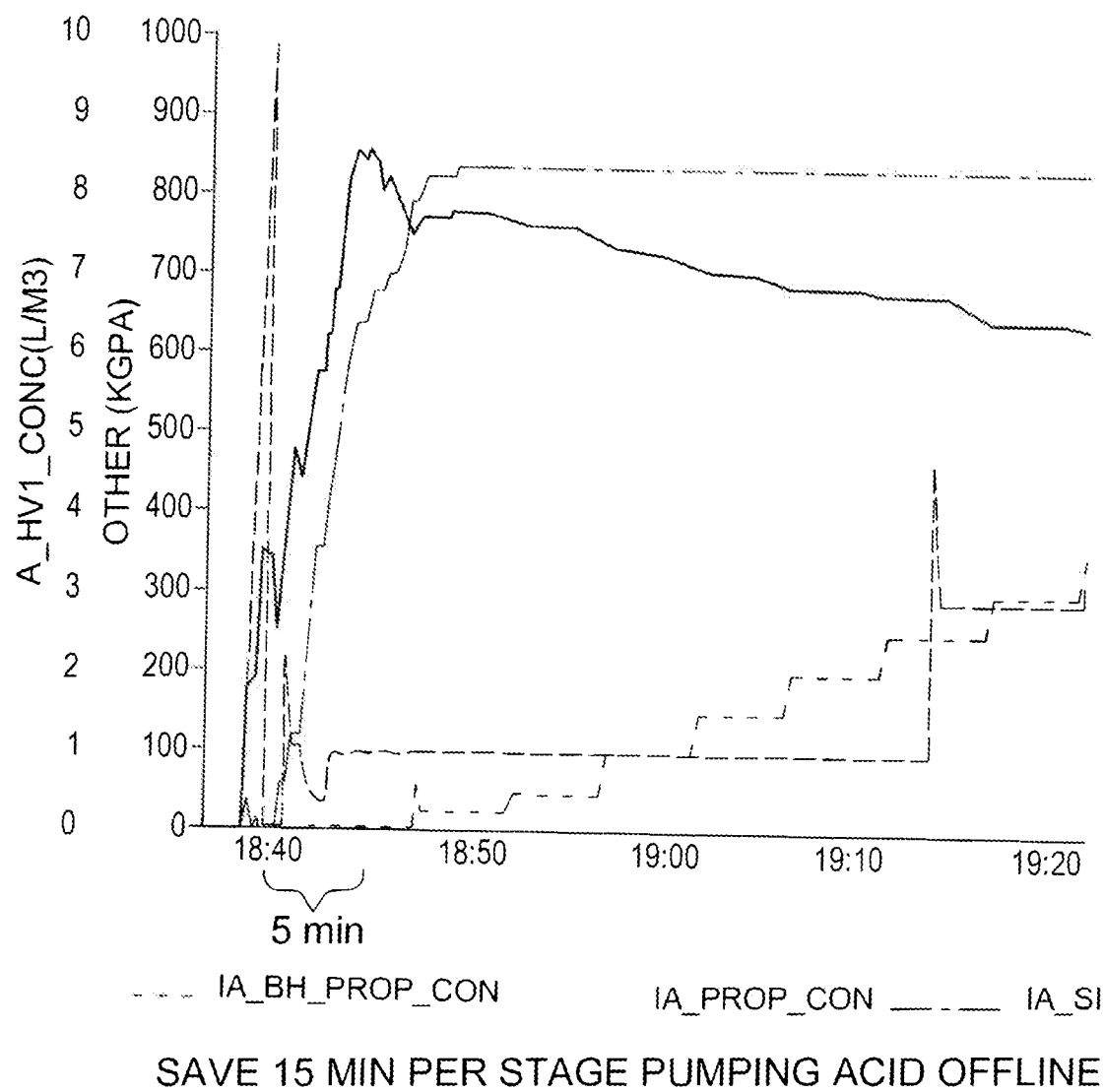

Approximately 97,500 gals of a modified acid using an alkanolamine:HCl composition with a corrosion package was delivered to location over the course of the treatment. Dilutions ranged from a 2-1 water-acid ratio to yield a 33% modified acid concentration and 1-1 for a 50% dilution. The blended modified acid (1300 gal) was placed in the wellbore and then the wireline and pump-down crews continued to the next well. As the treatment commenced, crews displaced acid to perforations with frac water. Once the acid reached the perforations an immediate pressure drop was observed, all frac pumps were brought on-line to pre-engineered rates and operations commenced. FIG. 3 illustrates the time advantage of using an embodiment of the method of the present invention (right graph) in comparison to the conventional method (left graph).

A significant pressure drop was observed as the acid reached the perforations and it was noted that breakdowns looked very similar to that obtained with 15% HCl which had been previously pumped on the same pad. Both the service company and operator were very pleased with the performance, ease of use of the acid while utilizing a technically advanced, safer and more environmentally responsible product along with eliminating corrosion concerns was a major value add to the customer and all involved with the project, whom had experienced casing integrity issues on prior wells due to the placement of the lower-tech spearhead acid blends. The modified acid composition allowed the company to have confidence that the casing metals were free from any major corrosion related issue for days that would have arisen by utilizing HCl. This time-saving method would not be possible with any existing HCl blends offered in the market.

Along with the safety aspect of the acid composition used, there is also the technical advantages it brought to the operations: low corrosion properties—<0.02 lb/ft$^2$ for more than 24 hrs; pump acid with wireline BHA (save time and water); in the event of surface equipment failure occur, there is no need to flush acid out of wellbore; the composition is hauled as a concentrate and diluted on location or on the fly; provides the ability to adjust acid strength for tougher breakdowns; fewer acid trucks on the road (landowner optics); it can be diluted with available water (produced/sea water/fresh). Additional benefits of the modified acid used in the example include: ultra-low long term corrosion effects (168 hrs); no precipitation of solubilized Ca post pH increase due to spending (minimizing or eliminating risks of formation damage); low fuming/vapor pressure; aggressive reaction rates; allowing spotting of acid with perforating guns via wireline; compatible with typical elastomers used in oil and gas; allows to adjust concentrations on the fly to target optimal pay zones; and it has a high thermal stability up to −190° C.

Example 4—Field Trial #2

Figure 4:
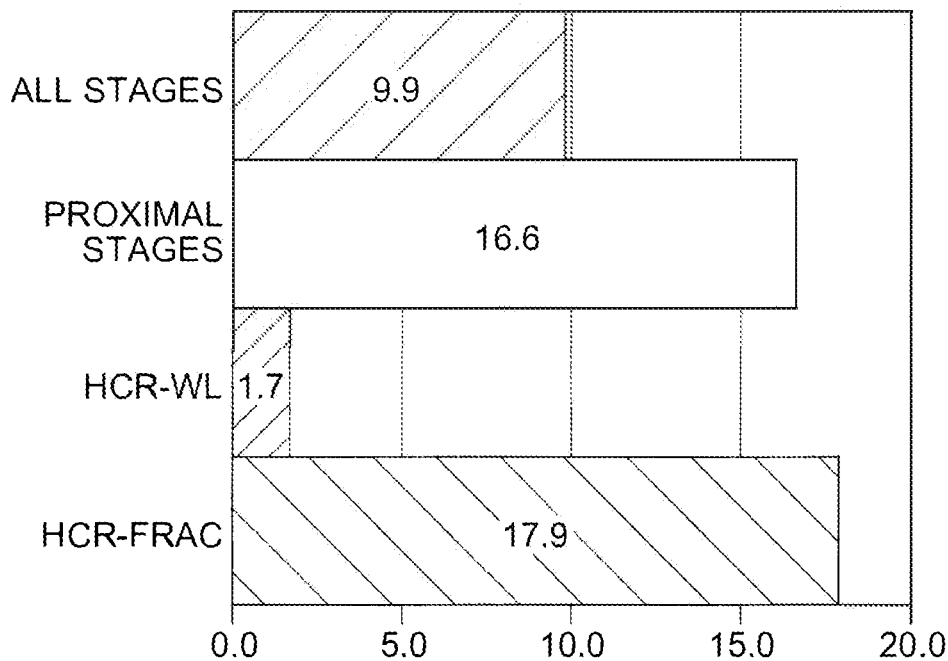
FIG. 4 illustrates a side-by-side bar graph comparison of the various stage times in the pre-fracking and fracking operations, the left graph showing a preferred embodiment of the method according to the present invention, the right graph showing the conventional process.
Figure 4:
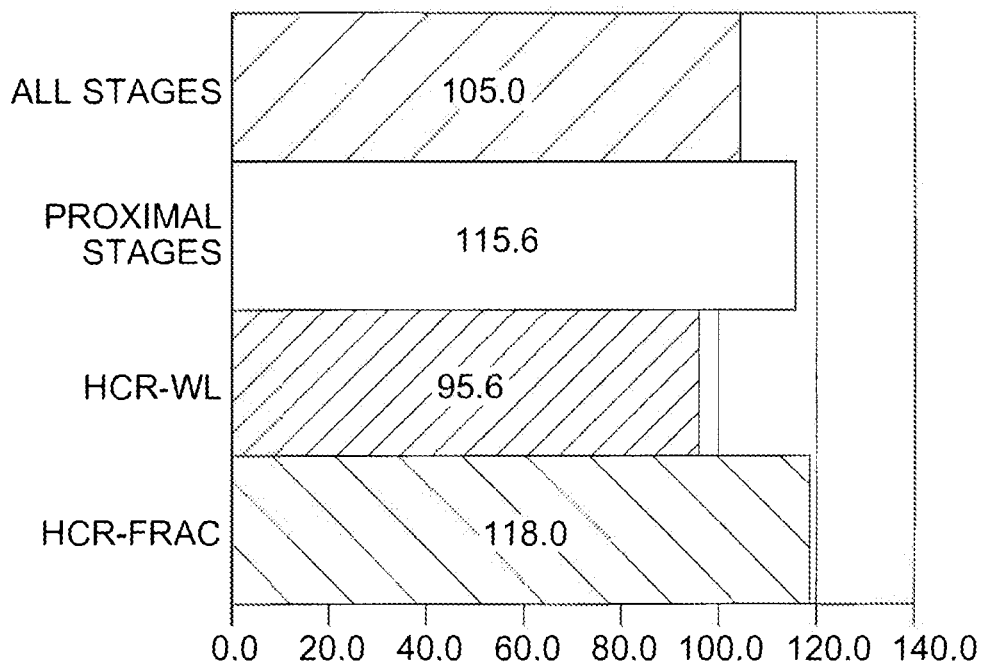

Another large Oil and Gas company carried out wireline plug and perforate operations and collected the below information in terms of performance. The average time from start of pumping to start of sand was determined to be 8.2 mins faster for wireline stages where the tools, acid and wireline went downhole together, compared to the average of all other stages. The average stage pump times were determined to be 9.4 mins lower for the Wireline acid deployed stages where acid was injected along with the perforating tool and wireline, compared to average of all other stages due to superior acid diversion across the perforation clusters. See FIG. 4 which highlights the difference in time for each step.

The company using the method according to a preferred embodiment of the present invention, noted the following spearhead acid operational efficiencies: the ability to pump acid with wire line and BHA (guns and bridge plug); the elimination of the need to place acid "after" wireline is out of the hole in another additional step; the reduced water requirements; savings of up to one half to one hole volume per frac (>10,000 gal water reduction per stage depending on depth); allowing acid to be spotted over the entire perf interval cluster; more effective cluster breakdown; increased frac crew efficiency with up to or over two (2) extra stages per day common; and shorter time to initiate the frac and get to programmed injection rates.

Example 5—Corrosion Testing on Various Wirelines

Corrosion testing was carried out on various common manufacturers' wireline using an acidic composition comprising an alkanolamine:HCl blend with a corrosion inhibitor package. The wireline material of four different manufacturers were tested corrosion resistance at a temperature of 130° C. and at 400 psi for periods of time ranging up to 24 hours of exposure. Table 7 (below) provides a summary of the corrosion data from this testing series.

TABLE 7

Corrosion Test Results of 33% composition comprising MEA:HCl (in 1:4.1 molar ratio) at 130° C. (266° F.) at 400 psi over various time periods

| | | Cumulative Weight Loss | | | | | | |
|---|---|---|---|---|---|---|---|---|
| | | 6 hrs | | 12 hrs | | 18 hrs | | 24 hrs | |
| Test | Sample | mm/yr | lb/ft² | mm/yr | lb/ft² | mm/yr | lb/ft² | mm/yr | lb/ft² |
| A | #1 clear wire | 19.727 | 0.022 | 22.121 | 0.024 | 25.423 | 0.028 | 28.146 | 0.031 |
| B | #2 clear wire | 18.902 | 0.021 | 20.800 | 0.023 | 23.854 | 0.026 | — | — |
| C | #3 clear wire | 19.810 | 0.022 | 23.772 | 0.026 | 27.651 | 0.030 | — | — |
| D | Sanded wire | 17.334 | 0.019 | 20.470 | 0.022 | 23.277 | 0.026 | 28.229 | 0.031 |

The results support the applicability and feasibility of the method according to a preferred embodiment of the present invention. Moreover, more optimal compositions falling within the scope of the present invention can be developed in order to obtain better financial, water-savings and/or corrosion results compared to the conventional processes.

According to another aspect of the present invention, there is provided a method to perform a downhole operation for drilling with acid to increase ROP (rate of penetration) through cement plugs, said method comprises the following steps:
  inserting a drilling tool inside a wellbore;
  injecting an acidic composition concurrently with the drilling tool;
  position the drilling tool within the wellbore at a point requiring drilling;
  contacting the surface requiring drilling with the acid and begin drilling; and
  continue the drilling operation until desired distance has been achieved;
  where the acidic composition comprises a corrosion inhibitor and is sufficiently balanced to complete the operation of dissolving the acid soluble debris within a time period which will leave the tool with (in some cases, minimal) corrosion damage from exposure to the acidic composition, and wherein the acidic composition comprises a corrosion inhibitor package as described above.

According to another aspect of the present invention, there is provided a method to perform a downhole operation for coiled tubing deployed acid washes, said method comprises the following steps:
  inserting a coiled tubing inside a wellbore;
  injecting an acidic composition concurrently with the drilling tool;
  position the drilling tool within the wellbore at a point requiring drilling;
  contacting the surface requiring drilling with the acid and begin drilling; and
  continue the drilling operation until desired distance has been achieved, where the acidic composition comprises a corrosion inhibitor and is sufficiently balanced to complete the operation of dissolving the acid soluble debris within a time period which will leave the tool with (in some cases, minimal) corrosion damage from exposure to the acidic composition, and wherein the acidic composition comprises a corrosion inhibitor package as described above.

According to another aspect of the present invention, there is provided a method to perform a downhole operation for coiled tubing deployed stimulation treatments said method comprises the following steps:
  inserting a coiled tubing inside a wellbore;
  injecting an acidic composition concurrently with the coiled tubing
  position the coiled tubing within the wellbore at a point requiring a treatment on said formation;
  contacting the surface requiring treatment with the acidic composition; and
  allow contact between the acidic composition and the formatiopn until the formation has been effectively treated, where the acidic composition comprises a corrosion inhibitor and is sufficiently balanced to complete the operation of dissolving the acid soluble debris within a time period which will leave the tool with acceptable (in some cases, minimal) corrosion damage from exposure to the acidic composition, and wherein the acidic composition comprises a corrosion inhibitor package as described above.

According to another aspect of the present invention, there is provided a method to perform a downhole operation for dissolving plugs and balls; wherein said method comprises the following steps:
  injecting an acidic composition down the wellbore at a position proximate to said ball and or plug;
  allowing sufficient contact time for the acidic composition to dissolve ball and or plug to allow further processing to occur while minimizing the corrosive effect on the casing, where the acidic composition comprises a corrosion inhibitor and is sufficiently balanced to complete the operation of dissolving the acid soluble items within a time period which will leave the other components with (in some cases, minimal) corrosion damage from exposure to the acidic composition, and wherein the acidic composition comprises a corrosion inhibitor package as described above.

According to another aspect of the present invention, there is provided a method to perform a downhole operation for isolated (thru coil) acid stimulations, wherein said method comprises the following steps:
  providing a wellbore comprising at least one area requiring acidization;
  injecting an acidic composition down the wellbore at a position proximate said area requiring acidization;
  allowing sufficient contact time for the acidic composition to perform the acidization or stimulation step;
  optionally, remove the tool;
  optionally, further process the acidized formation, where the acidic composition comprises a corrosion inhibitor and is sufficiently balanced to complete the operation of dissolving the acid soluble formation within a time period which will leave the tool, casing and coiled tubing with (in some cases, minimal) corrosion damage from exposure to the acidic composition, and wherein the acidic composition comprises a corrosion inhibitor package as described above.

According to another aspect of the present invention, there is provided a method to perform a downhole operation for fishing tools in the presence of an acid to consume acid soluble formation. metal or cement debris on top of the tool trying to be recovered, wherein said method comprises the following steps:
- injecting an acidic composition down the wellbore concurrently with a fishing tool spear or overshot at a position proximate a said debris;
- allowing sufficient contact time for the acidic composition to dissolve debris to allow recovery of the item to occur, where the acidic composition comprises a corrosion inhibitor and is sufficiently balanced to complete the operation of dissolving the acid soluble debris within a time period which will leave the tool with (in some cases, minimal) corrosion damage from exposure to the acidic composition, and wherein the acidic composition comprises a corrosion inhibitor package as described above.

According to another aspect of the present invention, there is provided a method to perform a downhole operation for stuck coil or pipe or tools in casing or open hole, where the sticking is caused by an acid soluble debris, said method comprising the steps of:
- injecting an acidic composition in the wellbore;
- directing the acidic composition at a point within the wellbore where said coil or pipe is stuck
- allowing the acidic composition sufficient contact time at and near said area to allow the acid soluble debris to be dissolved by the acidic composition, where the acidic composition comprises a corrosion inhibitor and is sufficiently balanced to complete the operation of dissolving the acid soluble debris within a time period which will leave the tool, casing or tubing with (in some cases, minimal) corrosion damage from exposure to the acidic composition and wherein the acidic composition comprises a corrosion inhibitor package as described above.

Preferably, the following are some of the tools that may be used as part of a bottom hole assembly (BHA): drilling motors; washing tools; perforating guns; fishing tools; isolation plugs; balls, flow controls/chokes, safety valves; any BHA with a high stainless-steel metal content in general.

According to another aspect of the present invention, there is provided a method to perform a debris and scale management inside wellbores when having both a tool and an acid present at the same time. According to a preferred embodiment of a method of the present invention, one can perform spotting acid to dislodge stuck pipes inside a wellbore. Preferably, coiled tubing or a BHA (bottom hole assembly) injected into the wellbore can help free downhole in situ items like chokes or flow-controls, safety valves, etc. According to a preferred embodiment of a method of the present invention, one can perform an operation to clean a wellbore with a reaming or wash tool in the presence of an acid.

According to another aspect of the present invention, there is provided a method to perform a downhole operation for spotting acid in a wellbore, said method comprising the steps of:
- providing a wellbore in need of stimulation;
- inserting a plug in the wellbore at a location slightly beyond a predetermined location;
- inserting a perforating tool and a spearhead or breakdown acid into the wellbore;
- positioning the tool at said predetermined location;
- perforating the wellbore with the tool thereby creating a perforated area; and
- allowing the spearhead acid to come into contact with the perforated area for a predetermined period of time sufficient or perforating in the acid, where the acidic composition comprises a corrosion inhibitor and is sufficiently balanced to complete the operation of dissolving the acid soluble debris within a time period which will leave the tool with (in some cases, minimal) corrosion damage from exposure to the acidic composition, and wherein the acidic composition comprises a corrosion inhibitor package as described above.

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

The invention claimed is:

1. A method for the stimulation of a hydrocarbon-bearing formation, said method comprising steps of:
   providing a wellbore having a casing;
   inserting a plug in the wellbore at a location beyond a predetermined location;
   inserting a perforating tool, a wireline and a spearhead or breakdown acid composition into the wellbore;
   wherein said breakdown acidic composition is in direct contact with said perforating tool, said wireline and said casing;
   positioning the perforating tool at said predetermined location;
   perforating the wellbore with the perforating tool thereby creating a perforated area and acid soluble debris;
   causing the spearhead acid to come into contact with the perforated area for a predetermined period of time sufficient to prepare the hydrocarbon-bearing formation for frackling or stimulation;
   removing the perforating tool form the wellbore;
   initiating stimulation of the perforated area using a stimulation fluid:
   wherein the breakdown acidic composition comprises an acid and a corrosion inhibitor package and the breakdown acidic composition is balanced to complete an operation of dissolving the acid soluble debris and the balanced breakdown acidic composition will leave the perforating tool with less corrosion damage from exposure to the breakdown acidic composition; wherein said corrosion inhibitor package comprising comprises at least two compounds selected from: Group A; and Group F and where the at least two compounds are selected from different groups; and: wherein:
   Group A comprises compounds encompass within the following general chemical description: α, β-unsaturated aldehyde; Formaldehyde; Cinnamaldehyde;
   Group F comprises compounds encompassed within the following general chemical description:
   morpholine;
   aminoalkyl imidazolines;
   sarcosine; —two linked cyclic molecules with at least one nitrogen heterocycle, including quinoline+benzyl;
   imidazoline; and
   alkyl pyridine; step.

2. The method according to claim 1 where the Group A compound is selected from the group consisting of:
   α,β-unsaturated aldehyde selected from the group consisting of:

cinnamaldehyde, t-cinnamaldehyde, crotonaldehyde, acrolein, methacrolein, leafaldehyde, citral, furfural, (E)-2-methyl-2-butenal, β-methyl-2-butenal, (E)-2-ethyl-2-butenal, (E)-2-ethyl-2-hexenal, 2-hexenal, 2-heptenal, 2-octenal, 2-nonenal, 2-decenal, 2-undecenal, 2-dodecenal, 2,4-hexadienal, 2,4-heptadienal, 2,4-octadienal, 2,4-nonadienal, 2,4-decadienal, 2,4-undecadienal, 2,4-dodecadienal, 2,6-dodecadienal, 1-formyl-[2-(2-methylvinyl)]-2-n-octylethylene, dicinnamaldehyde, p-hydroxycinnamaldehyde, p-methylcinnamaldehyde, pethylcinnamaldehyde,
p-methoxycinnamaldehyde, pdimethylaminocinnamaldehyde,
p-diethylaminocinnamaldehyde, pnitrocinnamaldehyde,
o-nitrocinnamaldehyde, o-allyloxycinnamaldehyde, 4-(3-propenal)cinnamaldehyde, p-sodiumsulfocinnamaldehyde,
ptrimethylammoniumcinnamaldehydesulfate,
ptrimethylammoniumcinnamaldehydeo-methylsulfate,
pthiocyanocinnamaldehyde,
p-(S-acetyl)thiocinnamaldehyde, p-(S—N,Ndimethylcarbamoylthio) cinnamaldehyde, p-chlorocinnamaldehyde, 5-phenyl-2,4-pentadienal, 5-(p-methoxyphenyl)-2,4-pentadienal, 2,3-diphenylacrolein, 3,3-diphenylacrolein, α-methylcinnamaldehyde, β-methylcinnamaldehyde, α-chlorocinnamaldehyde, α-bromocinnamaldehyde, α-butylcinnamaldehyde, α-amylcinnamaldehyde, α-hexylcinnamaldehyde, 2-(p-methylbenzylidine)decanal, α-bromo-p-cyanocinnamaldehyde, α-ethyl-p-methylcinnamaldehyde, p-methyl-α-pentylcinnamaldehyde, 3,4-dimethoxy-α-methylcinnamaldehyde, α-[(4-methylphenyl)methylene]benzeneacetaldehyde, α-(hydroxymethylene)-4-methylbenzylacetaldehyde, 4-chloro-α-(hydroxymethylene)benzeneacetaldehyde, α-nonylidenebenzeneacetaldehyde, derivatives thereof, and combinations thereof.

3. The method according to claim 1 where the corrosion inhibition package can be selected from the following combinations of group where reactions occur between compounds of said groups:
  a compound of Group F reacted with a compound of Group A.

* * * * *

UNITED STATES PATENT AND TRADEMARK OFFICE
CERTIFICATE OF CORRECTION

| | | |
|---|---|---|
| PATENT NO. | : 12,018,210 B2 | Page 1 of 1 |
| APPLICATION NO. | : 18/069091 | |
| DATED | : June 25, 2024 | |
| INVENTOR(S) | : Clay Purdy and Markus Weissenberger | |

It is certified that error appears in the above-identified patent and that said Letters Patent is hereby corrected as shown below:

In the Claims

Column 28 on Line 38 Claim 1:
The sentence "for frackling or stimulation;" should be corrected as "for fracking or stimulation;".

Column 28 on Line 63 Claim 1:
The sentence "alkyl pyridine; step." should be corrected as "alkyl pyridine.".

Column 29 on Line 3 Claim 2:
The term "β-methyl-2-butenal" should be corrected as "3-methyl-2-butenal".

Column 30 on Line 6 Claim 2:
The term "α-ethyl-p-methylcinnamaldehyde" should be corrected as "a-ethyl-p-methylcinnamaldehyde".

Signed and Sealed this
Tenth Day of September, 2024

Katherine Kelly Vidal
*Director of the United States Patent and Trademark Office*